(12) United States Patent
Kobayashi

(10) Patent No.: US 11,558,527 B2
(45) Date of Patent: Jan. 17, 2023

(54) INFORMATION PROCESSING APPARATUS AND NON-TRANSITORY COMPUTER READABLE MEDIUM STORING INFORMATION PROCESSING PROGRAM

(71) Applicant: FUJIFILM Business Innovation Corp., Tokyo (JP)

(72) Inventor: Yujiro Kobayashi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/383,413

(22) Filed: Jul. 22, 2021

(65) Prior Publication Data

US 2022/0303421 A1    Sep. 22, 2022

(30) Foreign Application Priority Data

Mar. 16, 2021   (JP) .............................. JP2021-042733

(51) Int. Cl.
*H04N 1/00* (2006.01)

(52) U.S. Cl.
CPC ....... *H04N 1/00938* (2013.01); *H04N 1/0097* (2013.01); *H04N 1/00408* (2013.01)

(58) Field of Classification Search
None
See application file for complete search history.

(56) References Cited

U.S. PATENT DOCUMENTS

| | | | |
|---|---|---|---|
| 2009/0280844 A1* | 11/2009 | Norton | H04L 65/765 455/466 |
| 2017/0235848 A1* | 8/2017 | Van Dusen | G06N 5/02 705/12 |
| 2020/0236009 A1* | 7/2020 | Meyer | G06Q 40/02 |

FOREIGN PATENT DOCUMENTS

JP    5338571    11/2013

\* cited by examiner

*Primary Examiner* — Frantz Bataille
(74) *Attorney, Agent, or Firm* — JCIPRNET

(57) ABSTRACT

An information processing apparatus includes a processor configured to select a plug-in related to a function of the information processing apparatus, the plug-in being used to expand a function executed by an apparatus, from an aggregated plug-in in which plug-ins for each of a plural functions are aggregated, and expand the function by using the plug-in.

9 Claims, 4 Drawing Sheets

| | | | REMAINING RECORDING CAPACITY: 30 MB | |
|---|---|---|---|---|
| | SELECTION | PACKAGE NAME | PACKAGE SIZE | DETAIL |
| 31 | INTRODUCTION | PACKAGE A | 40 MB | DETAIL | 32
| | INTRODUCTION | PACKAGE B | 5 MB | DETAIL |
| | INTRODUCTION | PACKAGE C | 10 MB | DETAIL |
| | ⋮ | ⋮ | ⋮ | ⋮ |

FIG. 5

| | | | | INTRODUCTION |—41 |
|---|---|---|---|---|---|
| PACKAGE NAME: PACKAGE A | | REMAINING RECORDING CAPACITY: 30 MB | | | |
| NECESSITY | NAME OF FUNCTION | REQUIRED FUNCTION | PLUG-IN SIZE | | |
| YES | READING FUNCTION | SCAN/COPY | 15 MB | | |
| YES | TRANSFER FUNCTION | SCAN | 5 MB | | |
| NO | FAX FUNCTION | FAX | 15 MB | | |
| YES | PRINT FUNCTION | PRINT/COPY | 5 MB | | |
| ⋮ | ⋮ | ⋮ | ⋮ | | |

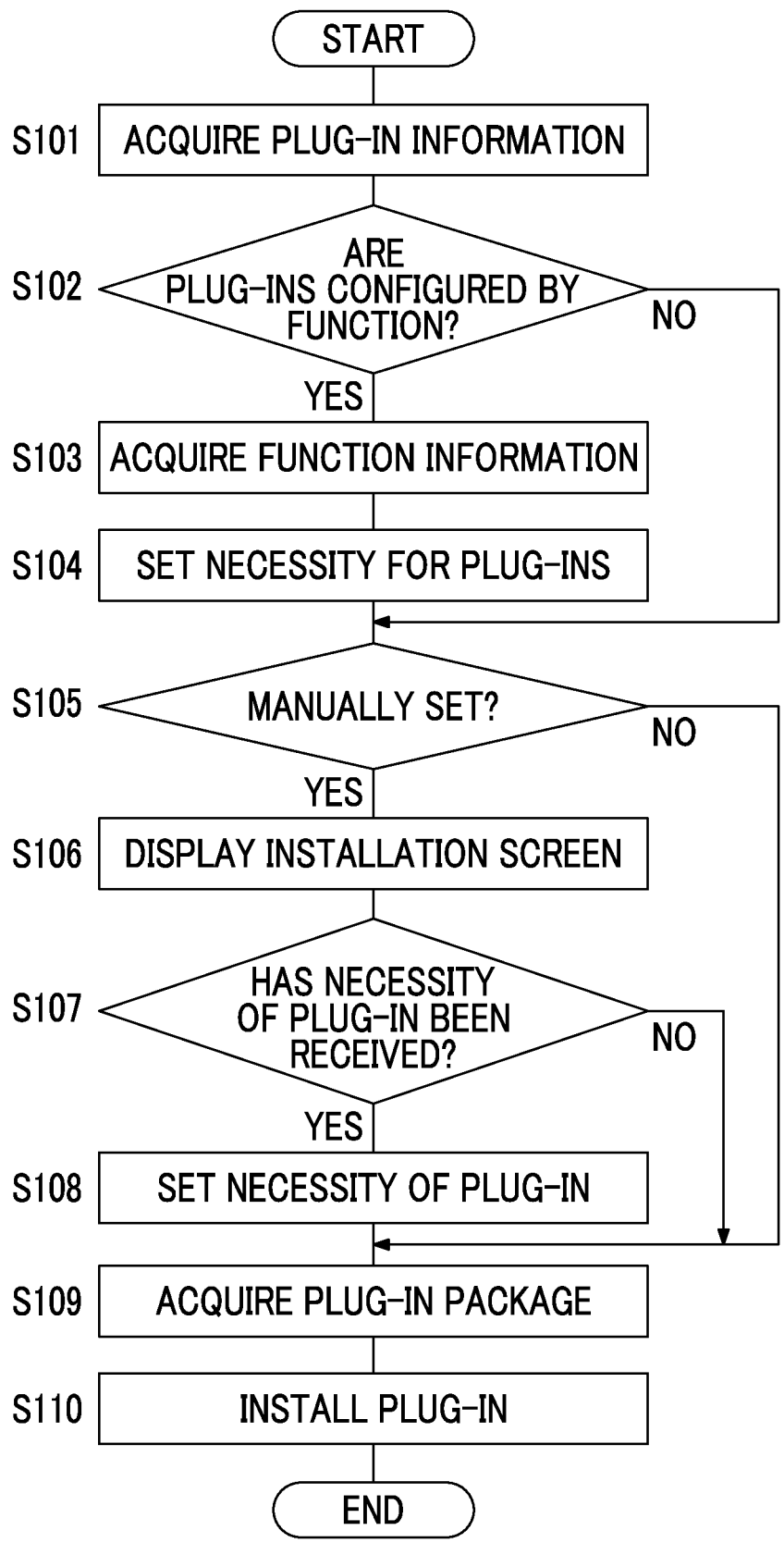

INFORMATION PROCESSING APPARATUS AND NON-TRANSITORY COMPUTER READABLE MEDIUM STORING INFORMATION PROCESSING PROGRAM

CROSS-REFERENCE TO RELATED APPLICATIONS

This application is based on and claims priority under 35 USC 119 from Japanese Patent Application No. 2021-042733 filed Mar. 16, 2021.

BACKGROUND

(i) Technical Field

The present invention relates to an information processing apparatus and a non-transitory computer readable medium storing an information processing program.

(ii) Related Art

JP5338571B discloses an image processing system including an image processing apparatus and a management apparatus connected to each other via a network, in which the management apparatus includes means for acquiring remote environment data for recording a plug-in program owned by the image processing apparatus to be managed in accordance with changes in a content of a flow definition for continuously executing a plurality of pieces of processing on image data, means for generating plug-in environment data for recording a plug-in program to be held in the image processing apparatus to be managed in accordance with the flow definition, means for generating difference data for recording a difference between the remote environment data and the plug-in environment data, means for acquiring infrastructure environment data for describing an execution infrastructure environment of the plug-in program of the image processing apparatus to be managed, means for reading the difference data and the infrastructure environment data to determine suitability of providing the plug-in program and a version to be provided, and means for transmitting setting data for instructing a construction of a plug-in environment to the image processing apparatus according to the determination of the means for determining, and a technique in which the image processing apparatus updates the plug-in environment of the image processing apparatus according to the setting data received from the management apparatus.

SUMMARY

In recent years, expansion of a function of an apparatus has been performed by acquiring a plug-in for expanding a function of an apparatus via a network from a management server.

By the way, in a case of acquiring a plug-in, a plurality of functions may be expanded in the same occasion by acquiring a package in which plug-ins related to a plurality of functions are integrated into one.

The management server transmits the package to the apparatus, installs all the plug-ins related to the package in the apparatus, and performs function expansion of the apparatus. There is a technique in which the management server stores the plug-ins required for function expansion in advance for each apparatus, transmits an instruction to uninstall plug-ins that are not required for function expansion in the apparatus among the plug-ins installed, and controls the function expansion in the apparatus.

In a case where a recording capacity for recording installed plug-ins is limited, it is necessary to suppress the recording capacity required for installation.

However, in a case of installing all the plug-ins related to the package, it is not always possible to suppress the recording capacity required for the installation.

Aspects of non-limiting embodiments of the present disclosure relate to an information processing apparatus and a non-transitory computer readable medium storing an information processing program that may suppress a recording capacity required for installation compared to a case of installing all plug-ins related to a package.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor configured to select a plug-in related to a function of the information processing apparatus, the plug-in being used to expand a function executed by an apparatus, from an aggregated plug-in in which plug-ins for each of a plurality of functions are aggregated, and expand the function by using the plug-in.

BRIEF DESCRIPTION OF THE DRAWINGS

Exemplary embodiment(s) of the present invention will be described in detail based on the following figures, wherein:

FIG. 5 is a front view showing an example of a package detail screen according to a present exemplary embodiment; and FIG. 6 is a flowchart showing an example of a flow of processing of installing a plug-in according to a present exemplary embodiment.

DETAILED DESCRIPTION

Hereinafter, examples of the exemplary embodiment for carrying out the present invention will be described in detail with reference to the drawings.

Figure 1:
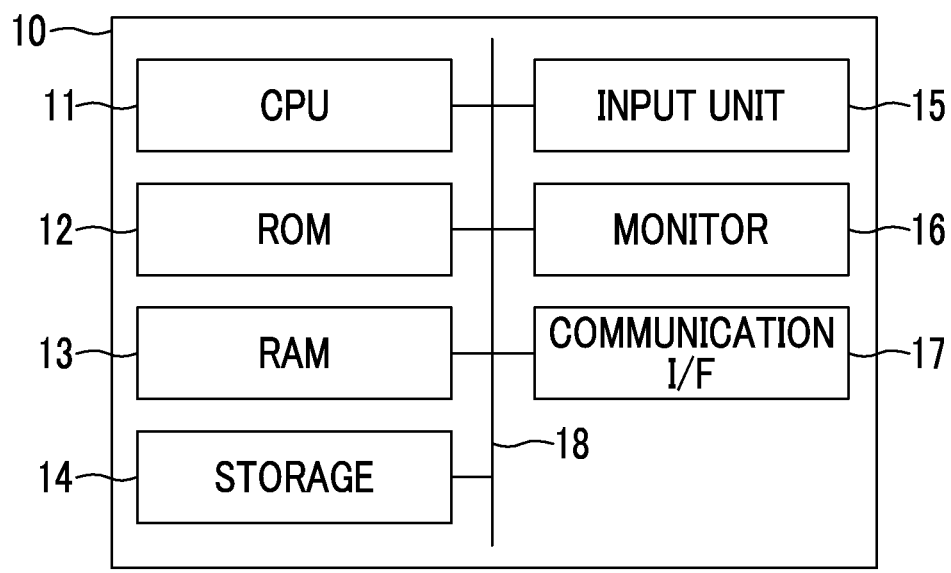
FIG. 1 is a block diagram showing a hardware configuration example of an information processing apparatus according to a present exemplary embodiment.

FIG. 1 is a block diagram showing an example of a hardware configuration of an information processing apparatus 10 according to the present exemplary embodiment. The information processing apparatus 10 installs a plug-in for expanding a function executed by the apparatus in the apparatus to expand the function. As an example, the information processing apparatus 10 according to the present exemplary embodiment will be described as being equipped on an image forming apparatus having functions such as a copy function and a scan function. However, the present exemplary embodiment is not limited to the image forming apparatus. The information processing apparatus 10 may be a terminal such as a personal computer that is separate from the image forming apparatus, a server, or a printing machine or the like having only a print function.

As shown in FIG. 1, the information processing apparatus 10 according to the present exemplary embodiment includes a central processing unit (CPU) 11, a read only memory (ROM) 12, a random access memory (RAM) 13, a storage 14, an input unit 15, a monitor 16, and a communication interface (communication I/F) 17. Each of the CPU 11, the ROM 12, the RAM 13, the storage 14, the input unit 15, the monitor 16, and the communication I/F 17 are connected to each other by a bus 18. Here, the CPU 11 is an example of a processor.

The CPU 11 rules and controls the entire information processing apparatus 10. The ROM 12 stores various programs including an information processing program used in the present exemplary embodiment, data, and the like. The RAM 13 is a memory used as a work area when executing various programs. The CPU 11 expands the program stored in the ROM 12 into the RAM 13 and executes the program to perform processing of installing a plug-in related to a plug-in package. The storage 14 is, for example, a hard disk drive (HDD), a solid state drive (SSD), a flash memory, or the like. Note that an information processing program or the like may be stored in the storage 14. The input unit 15 is a mouse, a keyboard, or the like that receives text input or the like. The monitor 16 displays a list and details of the plug-in package. The communication I/F 17 transmits and receives data.

Figure 2:
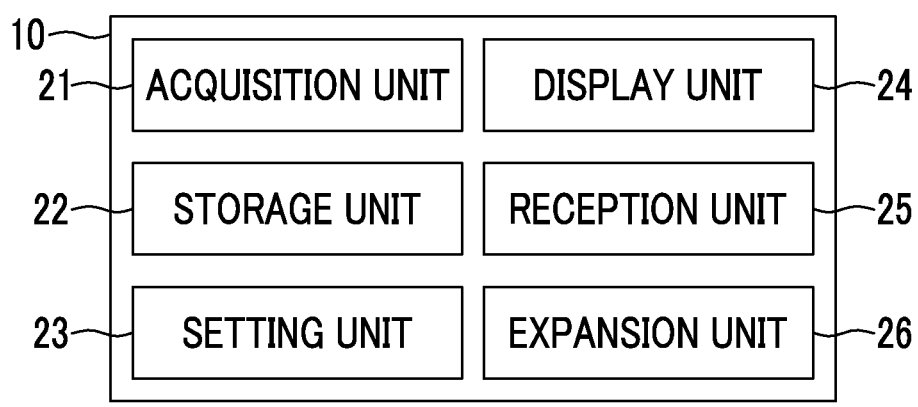
FIG. 2 is a block diagram showing a functional configuration example of an information processing apparatus according to a present exemplary embodiment.

Next, the functional configuration of the information processing apparatus 10 will be described with reference to FIG. 2. FIG. 2 is a block diagram showing a functional configuration example of the information processing apparatus 10 according to the present exemplary embodiment.

As shown in FIG. 2, the information processing apparatus 10 includes an acquisition unit 21, a storage unit 22, a setting unit 23, a display unit 24, a reception unit 25, and an expansion unit 26. In a case where the CPU 11 executes the information processing program, the CPU 11 functions as the acquisition unit 21, the storage unit 22, the setting unit 23, the display unit 24, the reception unit 25, and the expansion unit 26.

The acquisition unit 21 acquires a plug-in package in which plug-ins related to each function to be expanded are aggregated. Here, the plug-in package is an example of an "aggregated plug-in". Note that for the acquisition unit 21 according to the present exemplary embodiment, a mode for acquiring the plug-in package will be described. However, the present exemplary embodiment is not limited to the mode. The acquisition unit 21 may acquire the plug-in related to each function in different occasions.

In addition, the acquisition unit 21 acquires information related to the plug-ins related to the plug-in package (hereinafter, referred to as "plug-in information"). Here, the plug-in information is information such as a name of a plug-in included in the plug-in package, a name of a function supported by the plug-in, a name of a function required for installation, and a capacity of the plug-in.

The storage unit 22 stores information related to the function of the image forming apparatus (hereinafter, referred to as "function information"). The function information is, for example, information on functions that the information processing apparatus is equipped with, such as a scan function and a FAX function. Further, the storage unit 22 stores in advance setting of whether or not to expand the function set by a user as the function information for each function.

The setting unit 23 sets a plug-in to be installed from the plug-ins related to the acquired plug-in package. Specifically, the setting unit 23 determines whether or not to install the plug-ins related to the plug-in package acquired by the acquisition unit 21 by using the function information stored in the storage unit 22.

For example, the setting unit 23 compares the plug-in information with the function information, and determines whether or not the plug-in corresponds to the function related to the image forming apparatus. The setting unit 23 compares the plug-in information with the function information, and in a case where the function related to the plug-in included in the plug-in information and the function related to the function information correspond to each other, sets "Yes" for necessity setting of the plug-in. On the other hand, in a case where the function related to the plug-in included in the plug-in information and the function related to the function information do not correspond to each other, the setting unit 23 sets "No" for the necessity setting of the plug-in.

By setting the necessity setting by the setting unit 23, in a case of installing the plug-in, the plug-in required for the image forming apparatus is selected from the plug-ins related to the plug-in package, and an unnecessary plug-in is deleted.

Figures 3, 4:
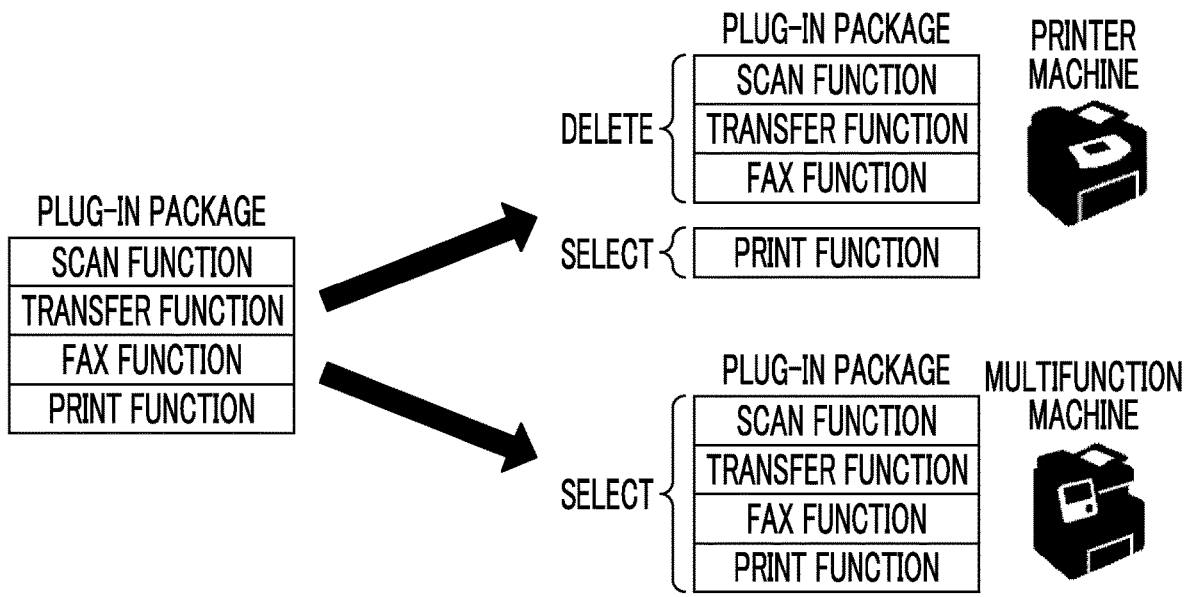
FIG. 3 is a schematic diagram showing an example of a plug-in package used for explaining selection of a plug-in according to a present exemplary embodiment.
FIG. 4 is a front view showing an example of an installation screen according to a present exemplary embodiment.

As an example, as shown in FIG. 3, in a case where the plug-in package includes plug-ins related to a scan function, a transfer function, a FAX function, and a print function, a printer machine equipped with the print function selects a plug-in related to the print function, installs the plug-in, and expands the function. Further, in a case of installing a plug-in, the printer machine performs installation by deleting the plug-ins related to the scan function, the transfer function, and the FAX function, which are not equipped with the printer machine, from the plug-in package.

On the other hand, a multifunction machine equipped with a scan function, a transfer function, a FAX function, and a print function selects the plug-ins related to the scan function, the transfer function, the FAX function, and the print function, performs installation, and expands the functions.

In addition, the function expansion is performed according to the setting of whether or not to expand the function set by the user stored in the function information. For example, in a case where the setting information is set in advance that the function expansion is not performed by the user, the setting unit 23 sets "No" for the necessity setting of the plug-in regardless of whether or not the functions of the plug-ins related to the plug-in package and the functions related to the function information correspond to each other.

The display unit 24 shown in FIG. 2 displays the acquired plug-in package and plug-in information. As an example, as shown in FIG. 4, the display unit 24 displays an installation screen 30. As shown in FIG. 4, the installation screen 30 displays a selection field, a package name, a package size, and a detail field. Here, the selection field displays an introduction button 31 for receiving the selection of the plug-in package to be installed, and the package name is a name for identifying the plug-in package to be installed. Further, the package size is the capacity of the plug-in package, and the detail field displays a detail button 32 for receiving an instruction for displaying detailed information of the plug-in package.

Further, the installation screen 30 displays the remaining recording capacity in the image forming apparatus, and the installable plug-in package is selected by comparing the package size with the remaining recording capacity of the image forming apparatus.

As an example, as shown in FIG. 5, in a case where the detail button 32 is pressed, the display unit 24 displays a package detail screen 40 as detailed information of the corresponding plug-in package. As shown in FIG. 5, the package detail screen 40 includes an introduction button 41 and a package detail display area 42. In a case where the introduction button 41 is pressed, the instruction to install the plug-ins related to the displayed package is received. Further, the package detail display area 42 displays a necessity field, a function name, a required function field, and a plug-in size as detailed information of the plug-in package. Here, the necessity field displays a necessity button 43 for selecting whether or not to install the plug-in, and the function name is the name of the function corresponding to the plug-in. In addition, the required function field displays the function of the image forming apparatus required to install the plug-in, and the plug-in size is the capacity of the plug-in.

In a case where "Yes" is set for the necessity setting of the plug-in determined by the setting unit 23, the package detail screen 40 displays a necessity button 43A indicating that "Yes" is set in the necessity setting in the necessity field of the corresponding plug-in.

In a case where "No" is set for the necessity setting of the plug-in determined by the setting unit 23, the package detail screen 40 displays a necessity button 43B indicating that "No" is set in the necessity setting in the necessity field of the corresponding plug-in. In addition, the package detail screen 40 indicates that the plug-in is not subject to installation by graying out the portions related to the plug-in.

Further, the package detail screen 40 displays the remaining recording capacity in the image forming apparatus, and the installable plug-in is selected by comparing the plug-in size with the remaining recording capacity.

In a case where the introduction button 31 on the installation screen 30 or the introduction button 41 on the package detail screen 40 is pressed, the reception unit 25 shown in FIG. 2 receives an instruction to install the plug-ins related to the plug-in package. Further, the reception unit 25 receives a fact that the plug-in is to be installed and that the plug-in is not installed by the necessity button 43 of the package detail screen 40 being pressed.

As an example, as shown in FIG. 5, in a case where the user presses the necessity button 43, the package detail screen 40 receives the user's selection of whether or not to install the plug-in.

For example, in a case where the necessity button 43A of the package detail screen 40 indicating "Yes" of the necessity setting is pressed by the user, the display unit 24 switches the display to the necessity button 43B indicating "No" of necessity setting, and the reception unit 25 receives the fact that the plug-in is not installed. Further, in a case where the fact that the plug-in is not installed is received, the setting unit 23 sets "No" in the necessity setting.

On the other hand, in a case where the necessity button 43B of the package detail screen 40 indicating "No" of the necessity setting is pressed by the user, the display unit 24 switches the display to the necessity button 43A indicating "Yes" of necessity setting, and the reception unit 25 receives the fact that the plug-in is installed. Further, in a case where the fact that the plug-in is installed is received, the setting unit 23 sets "Yes" in the necessity setting.

The expansion unit 26 installs the plug-ins in which "Yes" is set in the necessity setting by the setting unit 23 from the plug-in package in the image forming apparatus, thereby expanding the functions.

Here, the plug-in package acquired by the acquisition unit 21 is stored in a temporary area of the RAM 13, and the expansion unit 26 selects and installs the plug-ins in which "Yes" is set in the necessity setting, except for the plug-ins in which "No" is set in the necessity setting. By installing the plug-ins, the plug-ins are stored in a plug-in storage area of the storage 14, and the functions of the plug-ins are in a state in which the image forming apparatus may execute.

Note that in the present exemplary embodiment, a mode in which the plug-in to be installed is set in advance by the user, and the plug-in to be installed is displayed on the screen so that the user may select the plug-in has been described. However, the present exemplary embodiment is not limited to the mode above. It may be either a case where the plug-in to be installed is set in advance by the user or a case where the plug-in to be installed is selected by the user. For example, the installation may be set to be performed automatically and a preset plug-in may be installed, or the installation may be set to be performed manually and the plug-in selected by the user may be installed. Further, the user may be allowed to select the automatic or manual setting and record the selection in the function information. Also, in a case where there is only one plug-in package, the plug-in package may be installed automatically, and in a case where there are a plurality of plug-in packages, the installation screen 30 may be displayed and control for manually installing the plug-in package may be performed.

Next, the operation of the information processing apparatus 10 according to the present exemplary embodiment will be described with reference to FIG. 6. FIG. 6 is a flowchart showing an example of the processing of installing the plug-in according to the present exemplary embodiment. In a case where the CPU 11 reads and executes the information processing program from the ROM 12 or the storage 14, the information processing program shown in FIG. 6 is executed. The information processing program shown in FIG. 6 is executed, for example, in a case where an instruction to install a plug-in is input from the user.

In step S101, the CPU 11 acquires plug-in information.

In step S102, the CPU 11 performs determination whether there are a plurality of plug-ins related to the acquired plug-in information and the plug-ins are configured by function. In a case where the plug-ins are configured by function (step S102: YES), the CPU 11 proceeds to step S103. On the other hand, in a case where the plug-ins are not configured by function (in a case of a plug-in with a single function) (step S102: NO), the CPU 11 proceeds to step S105.

In step S103, the CPU 11 acquires function information related to the function of the image forming apparatus.

In step S104, the CPU 11 sets necessity setting for the plug-ins related to the plug-in package. Here, in a case where the function of the plug-in related to the plug-in information corresponds to the function related to the function information, "Yes" is set for the necessity setting with respect to the plug-in. On the other hand, in a case where the function of the plug-in related to the plug-in information does not correspond to the function related to the function information, "No" is set for the necessity setting with respect to the plug-in.

In step S105, the CPU 11 displays the installation screen 30 and determines whether or not to manually set the plug-in to be installed. In a case of manually setting the plug-in to be installed (step S105: YES), the CPU 11 proceeds to step S106. On the other hand, in a case where the plug-in to be installed is not set manually (step S105: NO), the CPU 11 proceeds to step S109.

In step S106, the CPU 11 displays the installation screen 30.

In step S107, the CPU 11 determines whether or not the necessity of the plug-in has been received. In a case where the necessity of the plug-in has been received (step S107: YES), the CPU 11 proceeds to step S108. On the other hand, in a case where the necessity of the plug-in has not been received (step S107: NO), the CPU 11 proceeds to step S109.

In step S108, the CPU 11 sets the necessity of the installation of the plug-in that has been received.

In step S109, the CPU 11 acquires the plug-in package to be installed.

In step S110, the CPU 11 installs the plug-in. Here, in a case where "No" is set for the necessity setting of the plug-in related to the plug-in package, the plug-in is deleted from the plug-in package, and in a case where "Yes" is set for the necessity setting, the plug-in is installed.

As described above, according to the present exemplary embodiment, the recording capacity required for installation may be suppressed as compared with a case where all the plug-ins related to the package are installed.

Note that for the information processing apparatus 10 according to the present exemplary embodiment, a mode in which the selection of the plug-in to be installed is received from the plug-in package has been described. However, the present exemplary embodiment is not limited to the mode above. The selection of plug-in related to function that has not been expanded in the past may be received.

For example, in a case where a certain plug-in included in the plug-in package is not installed, whether or not to install again may be selected in a certain occasion. Further, in a case of installing the certain plug-in, the plug-in package is acquired again, the certain plug-in is selected from the plug-in package acquired again, and the certain plug-in is installed. By acquiring the plug-in package again, the plug-in related to the latest function is installed.

Also, in a case where the plug-in related to the function that has been expanded in the past has been updated in the plug-in package acquired again, the plug-in related to the function that has been expanded in the past is installed from the plug-in package that has been acquired again.

By installing the certain plug-in acquired from the plug-in package and installing the updated plug-in related to the function that has been expanded in the past, inconsistency due to the difference in the version (version) of the plug-in may be suppressed.

Further, for the information processing apparatus 10 according to the present exemplary embodiment, a mode in which the selection of the plug-in to be installed is received has been described. However, the present exemplary embodiment is not limited to the mode above. It may be received that the plug-in has already been installed and the plug-in related to the expanded function is deleted. By deleting the plug-in related to the expanded function, the unused function is deleted and the recording capacity for recording the plug-in may be increased.

Although the present invention has been described above using each exemplary embodiment, the present invention is not limited to the scope described in each exemplary embodiment. Various changes or improvements may be made to each exemplary embodiment without departing from the gist of the present invention, and the modified or improved modes are also included in the technical scope of the present invention.

In the embodiments above, the term "processor" refers to hardware in abroad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

Further, in the present exemplary embodiment, a mode in which the information processing program is installed in the storage has been described, but the present exemplary embodiment is not limited to the mode. The information processing program according to the present exemplary embodiment may be provided in a mode in which the information processing program is recorded on a computer-readable storage medium. For example, the information processing program according to the exemplary embodiment of the present invention may be provided in a mode in which the information processing program is recorded on an optical disk such as a compact disc (CD)-ROM and a digital versatile disc (DVD)-ROM. The information processing program according to the exemplary embodiment of the present invention may be provided in a mode in which the information processing program is recorded in a semiconductor memory such as a universal serial bus (USB) memory and a memory card. Further, the information processing program according to the present exemplary embodiment may be acquired from an external apparatus via a communication line connected to the communication I/F.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor configured to:
select a plug-in related to a function of the information processing apparatus, the plug-in being used to expand a function executed by an apparatus, from an aggregated plug-in in which the plug-ins for each of a plurality of functions are aggregated, and expand the function by using the plug-in
and the processor is configured to:
display information related to the plug-ins related to the aggregated plug-in, and
receive a selection of a plug-in by a user from the displayed plug-ins.

2. The information processing apparatus according to claim 1,
wherein the processor is configured to:

store function information which is information on the function related to the information processing apparatus in advance and select a plug-in corresponding to the function related to the function information.

3. The information processing apparatus according to claim 2, wherein the processor is configured to:

receive necessity of expansion of a function from a user and store the necessity in the function information.

4. The information processing apparatus according to claim 1, wherein the processor is configured to:

in a case of performing expansion of a function related to a plug-in that has not been selected, acquire the aggregated plug-in again, and select the plug-in related to the function from the aggregated plug-in acquired again to expand the function.

5. The information processing apparatus according to claim 2, wherein the processor is configured to:

in a case of performing expansion of a function related to a plug-in that has not been selected, acquire the aggregated plug-in again, and select the plug-in related to the function from the aggregated plug-in acquired again to expand the function.

6. The information processing apparatus according to claim 3, wherein the processor is configured to:

in a case of performing expansion of a function related to a plug-in that has not been selected, acquire the aggregated plug-in again, and select the plug-in related to the function from the aggregated plug-in acquired again to expand the function.

7. The information processing apparatus according to claim 4, wherein the processor is configured to:

in a case where the aggregated plug-in acquired again includes a plug-in for which a function that has been expanded in the past is updated, acquire the plug-in related to the aggregated plug-in to update the function.

8. The information processing apparatus according to claim 1, wherein the processor is configured to:

for the expanded function, receive deletion of the function from the information processing apparatus.

9. A non-transitory computer readable medium storing an information processing program causing a computer to execute a process comprising:

selecting a plug-in related to a function of the information processing apparatus, the plug-in being used to expand a function executed by an apparatus, from an aggregated plug-in in which the plug-ins for each of a plurality of functions are aggregated, and expanding the function by using the plug-in, and further comprising:

displaying information related to the plug-ins related to the aggregated plug-in, and receiving a selection of a plug-in by a user from the displayed plug-ins.

* * * * *